(12) United States Patent
Gutesman et al.

(10) Patent No.: US 10,257,228 B2
(45) Date of Patent: Apr. 9, 2019

(54) SYSTEM AND METHOD FOR REAL TIME DETECTION AND PREVENTION OF SEGREGATION OF DUTIES VIOLATIONS IN BUSINESS-CRITICAL APPLICATIONS

(71) Applicant: Onapsis, Inc., Boston, MA (US)

(72) Inventors: Ezequiel David Gutesman, Ciudad de Buenos Aires (AR); Juan Pablo Perez Etchegoyen, Ciudad de Buenos Aires (AR); Pablo Müller, Buenos Aires (AR); Julián Rapisardi, Ciudad de Buenos Aires (AR)

(73) Assignee: Onapsis, Inc., Boston, MA (US)

( * ) Notice: Subject to any disclaimer, the term of this patent is extended or adjusted under 35 U.S.C. 154(b) by 344 days.

(21) Appl. No.: 14/923,491

(22) Filed: Oct. 27, 2015

(65) Prior Publication Data

US 2016/0119380 A1 Apr. 28, 2016

Related U.S. Application Data

(60) Provisional application No. 62/068,992, filed on Oct. 27, 2014.

(51) Int. Cl.
  *H04L 29/06* (2006.01)
(52) U.S. Cl.
  CPC .......... *H04L 63/20* (2013.01); *H04L 63/1416* (2013.01); *H04L 63/101* (2013.01)
(58) Field of Classification Search
  CPC .... H04L 63/20; H04L 63/1416; H04L 63/101
  USPC .......................................................... 726/1
  See application file for complete search history.

(56) References Cited

U.S. PATENT DOCUMENTS

| | | | |
|---|---|---|---|
| 7,340,469 B1 | 3/2008 | Alghathbar et al. | |
| 8,955,115 B2 | 2/2015 | Sabetta et al. | |
| 2002/0120482 A1 | 8/2002 | Anderson et al. | |
| 2005/0209876 A1 | 9/2005 | Kennis et al. | |
| 2006/0155738 A1 | 7/2006 | Baldwin et al. | |
| 2009/0320088 A1 | 12/2009 | Gill et al. | |
| 2010/0162406 A1 | 6/2010 | Benameur et al. | |
| 2011/0066562 A1 | 3/2011 | Stapleton et al. | |
| 2011/0164533 A1 | 7/2011 | Krumel | |

(Continued)

OTHER PUBLICATIONS

Oracle Business Activity Monitoring, Oracle Data Sheet, copyright 2009, 3 pages.

(Continued)

*Primary Examiner* — Izunna Okeke
*Assistant Examiner* — Angela R Holmes
(74) *Attorney, Agent, or Firm* — Peter A. Nieves; Sheehan Phinney Bass & Green PA

(57) ABSTRACT

A system is configured for real time detection and prevention of segregation of duties violations in business-critical applications. The system includes a software application monitor, a Segregation of Duties (SoD) conflict detection engine, a processor and a memory. The software application monitor configured to monitor an action executed by a user in the software application in real-time. The SoD conflict detection engine receives an action notification from the software application monitor having an action and an associated user, and determines whether the action is associated with a conflict in a conflict rule database. The engine looks up the user and action and determines if the user has permission to execute the action and/or if the user has previously executed the action, and if so outputs a preventive alert indicating a segregation of duties violation.

27 Claims, 8 Drawing Sheets

(56) References Cited

U.S. PATENT DOCUMENTS

2011/0258683 A1    10/2011   Cicchitto
2012/0072583 A1     3/2012   Kupferman et al.

OTHER PUBLICATIONS

International Search Report for PCT/US2015/057592, dated Jan. 27, 2016.
SAP SE; SAP Solution Brief; Protect Your Connected Business Systems by Identifying and Analyzing Threats; 2014.
SAP SE; SAP Enterprise Threat Detection presentation; Oct. 15, 2014.
Martin Plummer; Safeguard Your Business—Critical Data with Real-Time Detection and Analysis; SAPInsider Oct.-Dec. 2014 issue.

| PROCESS | NATIVE SEGREGATION OF DUTIES MATRIX | | | | | | | | | | | | | | |
|---|---|---|---|---|---|---|---|---|---|---|---|---|---|---|---|
| | GROUP NAME | GROUP | 01 | 02 | 03 | 04 | 05 | 06 | 07 | 08 | 09 | 10 | 11 | 12 |
| Revenue | CUSTOMER MASTER | 01 | | L | H | H | H | H | H | H | H | H | H | H |
| | BLOCKED CUSTOMERS | 02 | L | | | | | | M | M | M | M | M | |
| | CREDIT MANAGEMENT | 03 | H | | | | | | M | M | M | H | H | M |
| | CUSTOMER INCENTIVES | 04 | H | | | | | H | L | L | L | H | H | L |
| | CUSTOMER CONTRACTS | 05 | H | | | H | | | M | M | M | M | M | M |
| | REVENUE PRICING CONDITIONS | 06 | H | M | | | M | | M | M | H | H | H | M |
| | SALES ORDERS | 07 | H | M | M | M | M | M | | M | H | H | H | M |
| | A/R PAYMENTS | 08 | H | M | M | L | M | M | M | | H | M | H | H |
| | A/R ENTRY | 09 | H | M | M | L | M | H | H | H | | H | H | H |
| | SALES INVOICING | 10 | H | M | M | M | M | H | M | H | | | H | H |
| | APPROVE SALES ORDERS | 11 | H | M | H | H | M | H | H | H | H | | | M |
| | POST A/R PAYMENTS | 12 | H | | M | L | M | M | M | M | H | M | M | |

FIG. 8A

| Group | Group Description | Transaction Code |
|---|---|---|
| 07 | SALES ORDERS | VA01 |
| 07 | SALES ORDERS | VA02 |
| 01 | CUSTOMER MASTER | V-09 |
| 01 | CUSTOMER MASTER | V-08 |
| 01 | CUSTOMER MASTER | FD04 |
| 01 | CUSTOMER MASTER | FD02 |
| 01 | CUSTOMER MASTER | FD06 |
| 01 | CUSTOMER MASTER | V-03 |
| 01 | CUSTOMER MASTER | V-04 |
| 01 | CUSTOMER MASTER | V-07 |
| 01 | CUSTOMER MASTER | VD01 |
| 01 | CUSTOMER MASTER | V-05 |
| 01 | CUSTOMER MASTER | VD02 |
| 01 | CUSTOMER MASTER | VD06 |
| 01 | CUSTOMER MASTER | FD08 |
| 01 | CUSTOMER MASTER | V-12 |
| 01 | CUSTOMER MASTER | XD04 |
| 01 | CUSTOMER MASTER | XD01 |
| 01 | CUSTOMER MASTER | XD02 |
| 01 | CUSTOMER MASTER | XD06 |
| 01 | CUSTOMER MASTER | FD01 |
| 01 | CUSTOMER MASTER | XD07 |

FIG. 8B

| Group #1 | Description | Group #2 | Description | Risk | Risk Description |
|---|---|---|---|---|---|
| 07 | SALES ORDERS | 01 | CUSTOMER MASTER | H | User able to create an unauthorized or invalid customer and create / modify sales orders associated with the customer to reflect special unapproved sales, discounts or quantities. |

FIG. 8C

SYSTEM AND METHOD FOR REAL TIME DETECTION AND PREVENTION OF SEGREGATION OF DUTIES VIOLATIONS IN BUSINESS-CRITICAL APPLICATIONS

CROSS-REFERENCE TO RELATED APPLICATIONS

This application claims the benefit of U.S. Provisional Patent Application Ser. No. 62/068,992, filed Oct. 27, 2014, entitled "Real-time Segregation of Duties for Business-Critical Applications," which is incorporated by reference herein in its entirety.

TECHNICAL FIELD

The present invention is generally related to computer system security and, in particular, to the real time detection and prevention of segregation of duties violations in business-critical applications.

BACKGROUND OF THE INVENTION

Many medium and large enterprises rely on business-critical applications to manage their key business processes. Examples of these types of applications include solutions for Enterprise Resource Planning (ERP), Customer Relationship Management (CRM), Supplier Relationship Management (SRM), Supply Chain Management (SCM), Product Life-cycle Management (PLM), Human Capital Management (HCM), Business Intelligence (BI), and Integration Platforms, among others. Industry-recognized software products in this area may typically involve SAP NetWeaver-based solutions and the SAP™ R/3 platform, Oracle E-Business Suite, JD Edwards Enterprise One, PeopleSoft, Siebel and Microsoft Dynamics. These products are used in most of the Fortune-100 and large governmental organizations worldwide. SAP™ alone has more than 90,000 customers in more than 120 countries.

In this context, enterprises need to impose internal control mechanisms on, for example, key business functions such as financial transactions, sales, purchases, and supply-chain management, and technical activities such as creating users and granting permissions, amongst others, to prevent fraud, errors, and abuse while also enforcing accountability over the actions each of the users is allowed to perform and the data they are allowed to access while interacting with these business-critical applications. In particular, enterprises need to be aware of a scenario where the performance of a first authorized action by an individual creates a conflict with a second action that would otherwise be authorized for that individual, but for the performance of the first action by the individual. These controls are commonly referred to as Segregation of Duties (SoD for short). There are multiple tools and products that aid the enterprises in the process of defining and checking conflicts in the permissions assigned to users, some of them are: SAP GRC, Virsa, BizRights and INFOR from Approva, Deloitte eQSmart EdeX, Oracle Application Access Controls Governor for E-Business Suite, Saxaflow for SAP™, AuditBot for SAP™, and AllOut Security for JD Edwards, among others.

Current tools and applications that aid the enterprise in the task of SoD are used in the context of a project which may last, for example, from three to six months depending on the organizational maturity and whether the process is recurrent or performed only once. The objective of these projects is to check the permissions assigned to users by checking them against what is commonly known as the incompatibility matrices (or SoD matrices). These express the incompatible permissions/roles inside the business-critical applications, in the context of the analyzed organization. They are based on some pre-built models populated with conflicts that are common for a given platform (such as SAP™ or Oracle™ environments) for the organization. The process itself involves two steps:

First, the process is customized according to the business processes and users of each organization, also taking into account customizations to the audited business-critical applications such as custom transactions and reports (in an SAP™ environment) or custom programs (in Oracle environments). This is why the process typically has a three to six month duration. Second, the permissions for every single user are extracted from the business-critical applications and then the matrices are filled. After these steps have been completed, an analyst proceeds to process the information obtained and reporting all the incompatibilities that should be fixed.

The current state-of-the-art in the SoD practice presents some shortcomings that are key to the prevention and detection of potential frauds, errors and abuse of permissions. The SoD process is one of a static nature, such that once all the necessary information has been gathered, that information only shows a snapshot of the current status of the organization at the time when the information has been collected.

To better illustrate this problem, suppose company A performs a complete SoD analysis over its business-critical applications which lasts 3 months to be completed. By the end of the project, and since user permissions are dynamically changing every day, the violations detected based on the information collected originally might not be present any more, and new conflicts that could be generated by this dynamic change during the project's life might be overlooked by the analyst performing the SoD process.

Some existent tools try to tackle this problem either by periodically checking permissions of users, or by analyzing the access to sensitive data, which is defined in advance. Both approaches present weaknesses. Every periodical check of users' permissions still leaves a window where permissions can be granted and removed. On the other hand, defining sensitive data heavily relies on each organization's responsibility and is subject to misconfigurations and even omission by the employees defining this. At the same time there is a lack of a general approach independent from the audited platform, requiring instrumentation of every kind of user access, different between different vendors.

In view of the shortcomings discussed above, there is a need to overcome the drawbacks of the conventional techniques.

SUMMARY OF THE INVENTION

The present invention relates to detecting and preventing, in real time, violations to segregation of duties in business-critical applications. This is accomplished by analyzing how end-users interact with these applications through the dissection of application-specific protocols captured inside network traffic, thus being able to prevent and detect violations to a pre-defined set of incompatible roles and permissions defined in the business-critical applications. The present invention works closely with the incompatibility information defined in the tool of preference used in the enterprise to perform controls on SoD, frequently part of the general concept of Government Risk and Compliance (GRC) and also with information extracted from the monitored systems. The need for SoD analysis was boosted when the Sarbanes-Oxley Act was approved in 2002. Since then all publicly traded US companies have to perform SoD checks.

An exemplary embodiment of the system implementing the present invention is configured for real time detection and prevention of segregation of duties violations in business-critical applications. The system includes a software application monitor, a Segregation of Duties (SoD) conflict detection engine, a processor and a memory. The SoD conflict detection engine receives an action notification from the software application monitor having an action and an associated user, and determines whether the action is associated with a conflict in a conflict rule database. The engine looks up the user and action and determines if the user has permission to execute the action and/or if the user has previously executed the action, and if so outputs a preventive alert indicating a segregation of duties violation.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

FIG. 8A is a chart showing exemplary activities considered in conflict

FIG. 8B is a chart refining the data in FIG. 8A.

FIG. 8C is a chart showing risks imposed for a specific pair of conflicting activities enumerated in the matrix depicted in FIG. 8A.

DETAILED DESCRIPTION OF THE INVENTION

Figure 1:
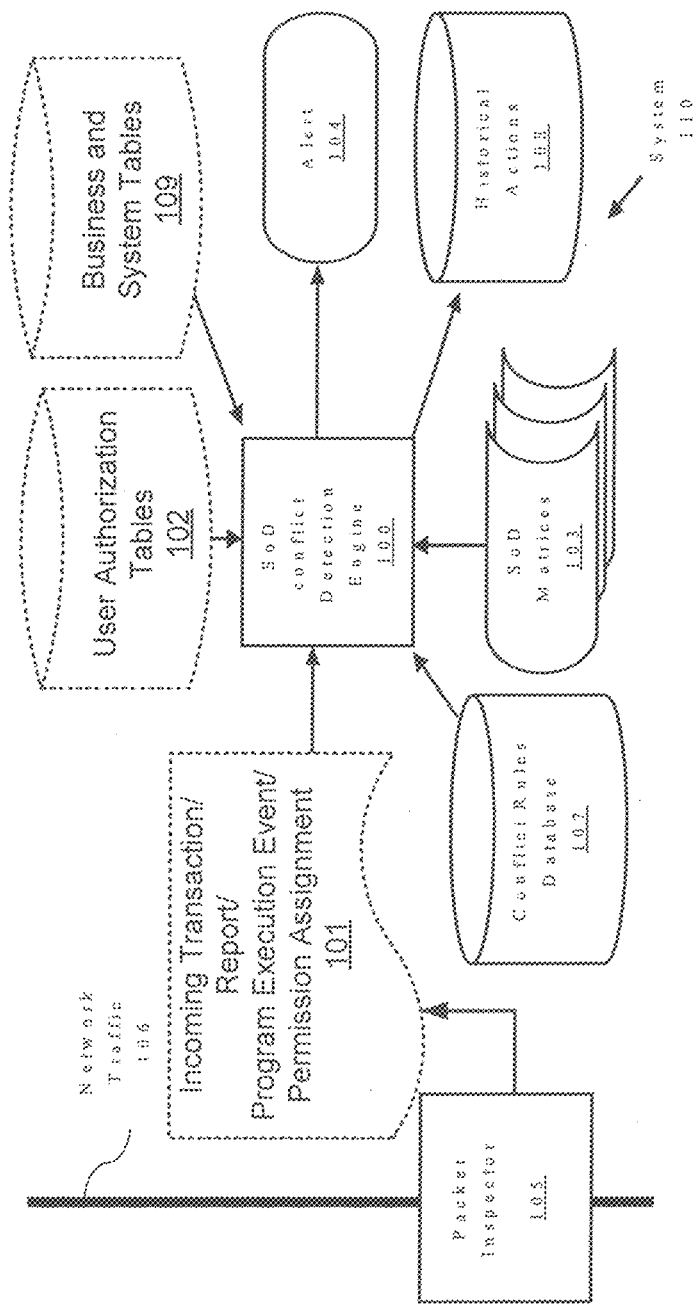
FIG. 1 is a schematic representation of an exemplary system for detecting and preventing real time segregation of duties violations.

The present invention provides systems and methods that provide a new approach to real time detection and prevention of segregation of duties violations affecting business-critical applications. Examples of such business-critical applications include, but are not limited to, Enterprise Resource Planning (ERP), Customer Relationship Management (CRM), Supplier Relationship Management (SRM), Supply Chain Management (SCM), Product Life-cycle Management (PLM), Human Capital Management (HCM), Integration Platforms. Business Warehouse (BW)/Business Intelligence (BI) and Integration applications developed by SAP™, Oracle™, Microsoft™, Siebel™, JD Edwards™ and PeopleSoft™.

It is an object of the present invention to decrease business fraud risks derived from the lack of visibility regarding changes in user authorizations, enforce compliance requirements and decrease audit costs for organizations using these business-critical applications.

The present invention overcomes the inefficiencies of the prior art by offering an effective real-time monitoring of the actions performed by users over the business-critical applications and, therefore, providing visibility on potential and effective violations to a pre-defined set of incompatibilities. As used in this disclosure, "real-time" refers to a window of time corresponding to a moment an event which triggers an incompatibility is captured inside network traffic.

As defined herein, an "action" refers to either the execution of a program, transaction, report or function inside the monitored business-critical application or to the assignment of a permission to a user, which would allow him to execute one particular program, transaction, report or function or a group of those inside the monitored business-critical application.

SoD matrices are elements defined by $3^{rd}$ party products used to perform SoD analysis. These matrices express conflicting actions in the business-critical application and are an input to the present embodiments. Two actions are considered to be in conflict if a user is authorized to execute both inside the same business-critical application. Conflicting actions could lead to fraudulent business activity. Avoiding fraud is the ultimate goal of the SoD analysis.

FIGS. 8A, 8B. 8C and 8D depict examples of SoD matrices. These may be first defined in an abstract manner and then refined to explicitly denote which programs and permissions must be checked in order to find a conflict. FIG. 8A shows the generic business activities considered in conflict. For example "Sales Orders" is conflicting with "Customer Master". Each conflict may be expressed with a corresponding risk level (Low, Medium or High). FIG. 8B refines the first matrix by enumerating, for each entry in the original matrix (FIG. 8A), those programs and functions which may be used inside the business-critical application to perform the activities in conflict. This particular example enumerates SAP programs, reports, and functions. In this example, VA01 and VA02 correspond to "Sales Orders." and V-08, V-09, et cetera correspond to "Customer Master." Finally, a third level depicted in FIG. 8C describes the risks imposed for that specific pair of conflicting activities enumerated in the matrix depicted in FIG. 8A.

FIG. 1 depicts a schematic representation of an exemplary system 110. The elements of the system are depicted with solid lines, while the elements of the monitored business-critical application are depicted in dashed lines. The system 110 queries one or more SoD matrices 103 templates which may be stored in the third party tools, and queries one or more user authorization tables 102 and also one or more business and system tables 109 residing in the monitored business-critical applications to get the permissions each user of that application has been assigned and the actions in the monitored system that comprise each authorization.

As used herein a "conflict rule" is defined as the set of conflicting actions given by the entries in the SoD matrices 103. A conflict rule is uniquely identified by two conflicting actions and contains the details of those conflicting actions as expressed by the SoD matrices 103. FIGS. 8A, 8B and 8C yield a conflict rule whose structure is (id="Sales Order vs. Customer Master", actions=a={"VA01", "VA02"}, b={"V-09", "V-08", "FD04". "FD02", "FD06", "V-03". "V-04", "V-07", "VD01", "V-05", "VD02", "VD06", "FD08", "V-12", "XD04", "XD01", "XD02", "XD06", "FD01", "XD07"}), the second component of the tuple are the conflicting sets. All actions in the first subset named a, are considered to be in conflict with any of the actions in the subset named b.

A conflict rule database 107 is a repository where all conflict rules are stored. It is populated by an SoD conflict detection engine 100 with all the different rules defined in the SoD matrices 103 read from $3^{rd}$ party applications and the data obtained from user authorization tables 102 and the business and technical tables 109. The conflict rule database 107 stores, for each action defined in the conflict rule, those actions in conflict with that action. This way the conflict rule database 107 may be accessed either by the conflict rule id or, given a fixed action, the system 110 may retrieve all the actions in conflict with that one, no matter which conflict rule they are contained in. The conflict rules database 107 may be implemented as, for example, a key-value storage, a data storage paradigm designed for storing, retrieving, and managing data based on unique identifiers such as the conflict rule ids or each of the names of transactions, reports or programs that may be looked up in the conflict rule database 107.

The SoD conflict detection engine 100 may process an action being performed by a user. The system may include a software application monitor configured to monitor an action executed by the user in real-time. For example, this action may be contained within a network packet captured by a packet inspector 105 from the network traffic 106. A captured action 101 may include the execution of a transaction, a program, or a permission assignment. The action 101 is used to test for conflict rules in both a preventive and a detective approach, for those rules stored in the conflict rules database 107.

While in the first embodiment the packet inspector 105 monitors user actions executed in the software application by capturing network traffic, in general, user actions being executed in the software application may be in monitored in real-time by other means. In alternative embodiments, a software application monitor may monitor and capture actions within the software application itself, for example, by constantly polling the software application and/or logs where the actions executed by users inside the software application are stored. For simplicity, this monitoring is described herein as being performed by the packet inspector 105.

A detective approach detecting conflict rules in captured network traffic aims to avoid the possibility of a user performing a potential fraud. The objective of a detective approach is to verify if a potential fraud has already been committed, by detecting the execution of conflicting actions.

On the other hand, the preventive approach detecting conflict rules inside network traffic addresses potential conflicting actions from being executed by a user. This may involve having the permissions to execute an action and at the same time actually executing a second action in conflict with that permission.

In order to determine when a conflict rule (as described above) is detected either on the preventive or the detective approach, the SoD conflict detection engine 100 reads the conflict rules database 107 and the user authorization tables 102 present in every business-critical application, stored in the database systems of the application. If any conflict rule is triggered, the system 110 raises an alert 104. After processing an execution event 101, the SoD conflict detection engine 100 may update a historical actions database 108. The historical actions database 108 logs the action for future lookups by the SoD conflict detection engine 100. The action stored includes a tuple of the form {<username>, <system_id>, <action>, <action_params>, <timestamp>}, where username is the username performing the action, system_id, is the system identifier (SID) where the action is being executed, action is the program, report, transaction or function being executed, action_params are the relevant parameters of the action performed (e.g. in the case of an action being "Create User" the action_params will contain the name of the user being created), and finally, the timestamp of the moment the action was captured by the system is also stored.

The SoD conflict detection engine produces an alert 104 as an output. Alerts 104 may be displayed to end users in a front end or consumed by other applications connected to the invention via a subscription through a software API. These alerts 104 contain the triggered conflict rule with the details of the actions triggering that conflict rule, as described previously.

The packet inspector 105, which may be implemented as a software module, captures network traffic 106, for example, by connecting the network interface of the computer machine it is running on to a span (or replication) port of any network switch. In the absence of such a port, the packet inspector 105 may also receive network traffic 106 forwarded through a purpose-specific hardware device or packet routing rule (not shown).

The packet inspector 105 is configured to recognize different protocols (vendor-specific and standard) related to business-critical applications, and is also configured to recognize application-standard protocols. Some examples of application-standard protocols include, but are not limited to, SAPDIAG, SAPRFC, P4, CORBA, SAP Management Console protocol, SAP Gateway protocol, and also standard HTTP for specific applications and services in SAP™ platforms. In the case of Oracle, the packet inspector 105 may analyze the JDENET protocol for JDEdwards and also standard HTTP packets targeting Oracle-specific web interfaces.

For each of these protocols, the packet inspector 105 distinguishes the packets used by end-users to execute actions, for example, creating users, assigning roles, posting payments, and the like. The packet inspector 105 may also verify, for example, solely by reading network traffic 106, whether the execution of the action was successful or not. As an example, the packet inspector 105 may recognize each SAPDIAG request to run a transaction, report or program. For each SAPDIAG connection between an end-user and an SAP server the packet inspector 105 maintains a structure in the system memory with information about the connection such as: the originating IP address and port of the connection, the destination IP address and port, the system identifier (SID), the username authenticated for that connection and the last transaction/report/function executed. Once the packet inspector 105 captures an execution request, the packet inspector 105 sets a flag in the structure and fills a last executed field. If, as a response to that execution request, the packet inspector 105 captures an error code, the packet inspector 105 confirms that the execution of the transaction was not successful and stores the error code together with its description. If, on the other hand, the packet inspector 105 begins capturing content packets (which may be used by the SAP server to ask the SAPGUI—front end—to start drawing the results of the execution) then the packet inspector 105 considers the execution successful.

The packet inspector 105 monitors network activity looking for business functions being run by users. This information is used to facilitate the conflict detection and prevention in the SoD conflict detection engine 100.

The ports and protocols monitored by the packet inspector 105 for SAP™ services and products is shown in Table 1. Some port numbers depend on the SAP™ instance number (a two-digit integer: NN). For example, the SAP™ dispatcher component port may be in the range of [3200, 3299]. This is equivalent to using 32NN notation. For SAP™ products, the events which are relevant to the packet inspector related to SoD conflict detection may include, among others, transactions executed, reports executed, RFC functions executed, web requests to business functions/applications, Java RMI calls to business functions, and/or access to business data in databases.

TABLE 1

| SAP™ Stack/ Product | Service/Protocol | Default | Ports Monitored | Fixed | Comments |
|---|---|---|---|---|---|
| Application Server ABAP | SAP™ Dispatcher | 3200 | 32NN | Yes | SAPGUI port for Win and Java |
|  | Gateway/RFC - CPIC | 3300 | 33NN | Yes | Used for CPIC and RFC communication |
|  | Gateway Secured | 4800 | 48NN | Yes | SNC for secured CPIC and RFC |
|  | ICM HTTP | Not Active | 80NN | No | Can be configured to port 80 after installation |
|  | ICM HTTPS | Not Active | 443NN | No |  |
| Application Server JAVA | HTTP | 50000 | 5NN00 | No |  |
|  | HTTP over SSL | 50001 | 5NN01 | No |  |
|  | IIOP initial context | 50002 | 5NN02 | No |  |
|  | IIOP over SSL | 50003 | 5NN03 | No |  |
|  | P4 | 50004 | 5NN04 | No |  |
|  | P4 over HTTP tunneling | 50005 | 5NN05 | No |  |
|  | P4 over SSL | 50006 | 5NN06 | No |  |
|  | IIOP | 50005 | 5NN07 | No |  |
| SAP™ HANA™ | indexserver | 30015 | 3NN15 |  | SQL/MDX access |
|  | staticserver | 30017 | 3NN17 |  | SQL/MDX access |
|  | XS HTTP | 8000 | 80NN | No | SAP™ Web dispatcher inside SAP™ HANA™ |
|  | XS HTTPS | 4300 | 43NN | No | SAP™ Web dispatcher inside SAP™ HANA™ |
|  | SOAP/HTTP | 50013 | 5NN13 |  |  |
|  | SOAP/HTTPS | 50014 | 5NN14 |  | SSL |

Table 2 lists the ports and protocols monitored by the packet inspector 105 for Oracle services and products. For Oracle products, exemplary interesting events the packet inspector 105 may capture may include program execution, web requests for business functions, and/or access to business data in databases.

TABLE 2

| Oracle Product | Service/Protocol | Default | Ports monitored | Fixed | Comments |
|---|---|---|---|---|---|
| Oracle JD Edwards | Database | 1521 | 1521 | No | Traffic from Enterprise Server to Database Server |
|  | Database agent | 14502 | 14502 | No | Traffic from Server Manager to Database Server |
|  | Enterprise | 6016 | 6016 | No | Traffic from Web Server to Enterprise Server |
|  | Enterprise Agent | 14502 | 14502 | No | Traffic from Server Manager to Enterprise Server |
|  | Web | 7001 | 7001 | No | Traffic from Browser client to Web Server |
|  | Web Agent | 14502 | 14502 | No | Traffic from Server Manager to Web Server |

TABLE 2-continued

| Oracle Product | Service/Protocol | Default | Ports monitored | Fixed | Comments |
|---|---|---|---|---|---|
| E Business Suite | Database | 1521 | 1521 | No | Traffic from Application Server to Database Server |
| | Web/Forms | 8000 | 8000 | No | Traffic from Browser Client to Web Server |

Figure 2:
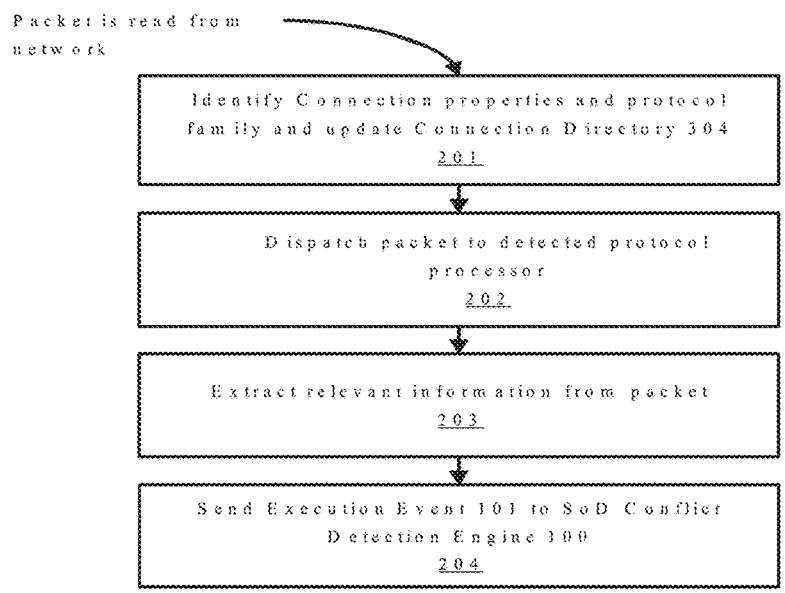
FIG. 2 is a flowchart of a first exemplary embodiment of a method for processing a packet captured by the packet inspector.

FIG. 2 is a flowchart depicting the method for processing a packet captured by the Packet Inspector 105 (FIG. 1). It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

The execution of these steps may be performed in an ordered fashion. The method is triggered when a packet of network traffic 106 is read form the network. The connection properties are identified by the packet inspector 105 inspecting the IP and TCP headers of the captured packet, as shown by block 201. Once the source and destination IP addresses and ports have been extracted, the connection is uniquely identified and an entry in the connection directory 304 (FIG. 3) is generated. This structure keeps track of the actions executed for a given connection and resides in memory.

Figure 3:
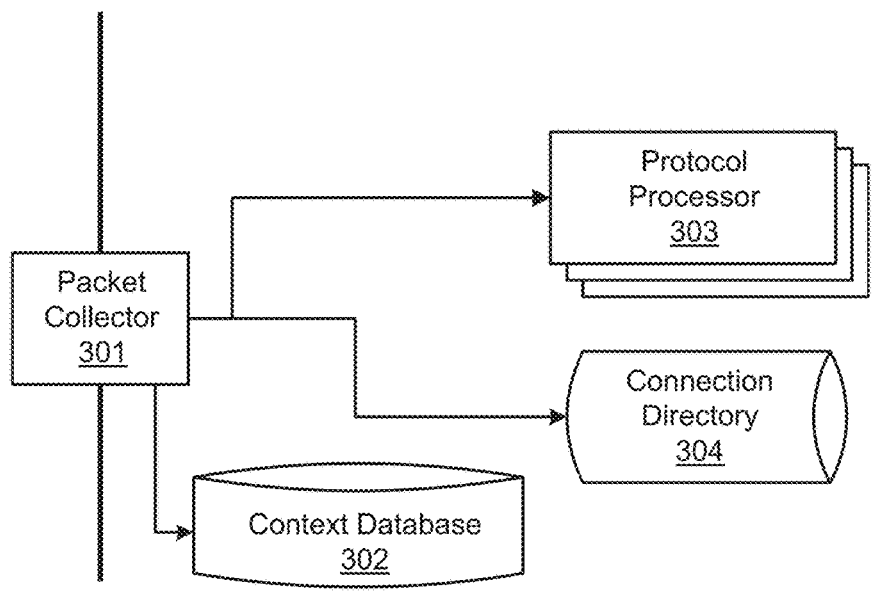
FIG. 3 is a block diagram of the packet inspector of FIG. 1.

The packet inspector 105 identifies the protocol family of the packet by analyzing the destination port and the packet payload. Once the packet inspector 105 has determined the protocol family, the packet inspector 105 dispatches the packet to an appropriate protocol processor 303 (FIG. 3), as shown by block 202. The protocol processor 303 (FIG. 3) extracts the relevant information identifying the connection (i.e. source and destination IP addresses and ports) from the packet and updates the connection entry in a connection directory 304 (FIG. 3). The protocol processor 303 (FIG. 3) extracts relevant information about the action being captured from the packet, and the packet inspector 105 triggers an action notification, in this case an execution event, and sends the action notification to the conflict detection engine 100.

FIG. 2 illustrates an example when a SAPDIAG packet is captured from the network. Once the packet is received, if the destination port is in the range of 3200-3299 (the range for 32XX as described in table 1) the packet inspector 105 updates (or creates it if it does not exist) the connection entry in the connection directory 304 (FIG. 3) using the source and destination IP address and port. The packet is sent to the DIAG protocol processor. The processor tests whether that traffic is compressed, since for this particular protocol a special compression algorithm may be used. The compression test is achieved by checking specific bytes inside the packet which indicate if the traffic is compressed when set to particular values. If so, the processor proceeds to decompressing the packet and then extracts a username, if present, since not all packets carry user information. The processor also extracts the name of the transaction/report/function being executed and an execution status (if present). If the packet is a response to an execution, the processor updates the connection directory entry with the status of the execution. After all this is done, the packet inspector 105 triggers an execution event 101 to the conflict detection engine 100.

FIG. 3 depicts the different components of the Packet Inspector 105. The context database 302 stores the port numbers and protocol names and properties of those protocols the packet inspector 105 is configured to monitor. This database 302 contains the information shown in Table 1 and Table 2, so every time the packet collector 301 receives a packet, the packet collector 301 may determine, for example, by querying the context database 302, whether this packet should be processed or not based on the packet destination port. The packet inspector 105 does not process packets from protocols outside the ones configured in the context database 302 that do not carry relevant information from the SoD perspective (for example, SSH, or Telnet, among others).

Once a packet is read from the network traffic, the packet collector 301 determines the protocol family according to the destination port and also by inferring the protocol based upon the packet structure. Once the protocol is determined, and if the context database 302 has an entry for the destination port, the packet collector 301 proceeds by dispatching the captured packet to the determined protocol processor 303. The packet collector also updates the connection directory 304 with the source and destination IP addresses and ports.

The protocol processor 303 extracts the relevant information from the packet such as, but not limited to, the user performing the action, the action being executed, parameters to that action being executed, the host where the action takes place, and a timestamp when the action is being executed. This information is updated in the connection directory 304 which stores the latest action executed inside each stored connection. The relevant information might differ according to the protocol of the communication network. For example, for database connections, the table and the database query being executed may be extracted, for user creation actions the username being created might also be extracted. Once the relevant information for the determined protocol is extracted from the packet by the protocol processor 303, an execution event may be triggered and sent to the SoD conflict detector 100 (FIG. 1).

Conflict Rules Database

The SoD conflict detection engine 100 populates the conflict rules database 107 by reading the SoD matrices 103 defined for the monitored systems. The SoD matrices 103 may be extracted from the tool being used for auditing the segregation of duties or GRC process such as SAP GRC.

SoD Conflict Detection Engine Detection Methods

The first embodiment may use one or more of three approaches to produce Alerts when an actual or potential SoD violation is detected in real-time:
  1. Preventive SoD violation:
  2. Detective SoD violation within process; and
  3. Historical SoD violation.

Each of the methods may use the existent SoD matrices 103 as input. These SoD matrices 103 are extracted from each of the products the organization is using to perform the SoD analysis.

Integrations with 3$^{rd}$ Party SoD Products

In companies already using SoD matrices, integrations can be made. In order to read SoD matrices being used by 3$^{rd}$ party systems, information can be taken from tables in their databases. In order to be able to do this, the 3$^{rd}$ party access control product used must be identified.

When working with SAP products, the described invention can integrate, thus read the SoD matrices, from the following tools:

SAP GRC—Access Control
Approva BizRights
Auditbots

On the Oracle industry, supported integrations are available with:

Oracle Application Access Controls Governor—For E-Business Suite
All Out Security (JDE)
Approva BizRights Integrations are performed in a standard manner as each 3$^{rd}$ party access control product requires.

The following examples illustrate the first embodiment.

EXAMPLE 1

Preventive SoD Violations

The present invention takes the traditional SoD approach one-step further with a preventive approach. The SoD conflict detection engine 100 receives the execution events and permission assignments 101 being assigned in real-time, as they appear inside network traffic. The execution events are those executed by the users and combined with the information extracted from the user authorization tables 102 and the business and system tables 109 the SoD conflict detection engine 100 has available the permissions they were granted with up to this point in time. The method has two variants. First, regarding executed events: if a user has the authorization to execute a pair of events considered to be in conflict, the system is able to send an alert once this user executed only one of those events, but before he actually executes the second one (but is authorized to do it). This way, the method raises a preventive alert. Once an execution event 101 is received, if the event is defined in the SoD matrices 103, the event is compared against the permissions the user has been granted with and which could allow the user to execute incompatible actions. For example, if the user executed action A and has permissions to execute action B, regardless if the user executed action B or not, there will be a preventive alert informing this situation, as it allows a potential SoD conflict.

Second, regarding new permissions, if the system captures an action where a user is being granted permissions, either by being assigned a new role or by already having a role that has just been modified, these new authorizations will be checked against the SoD matrices 103. If the new permissions given are in conflict with other authorizations detailed in the SoD matrices 103, the system 110 will verify whether the user has previously executed one of the actions conflicting with the newly assigned permissions.

For example, with SAP™, if a user has executed action B some (pre-configured, and fixed) time ago and today is granted permissions to execute transaction A—which happens to be in conflict with transaction B, the system triggers a preventive alert informing this situation, as it also allows a potential SoD conflict.

The SoD matrix is already defined for each company and fed into the invention as already described. If there is a tool providing this feature, the system will then extract that matrices from the SAP™/Oracle™ tables, and use it to make the mentioned analysis as described in the integrations section.

Figure 4A:
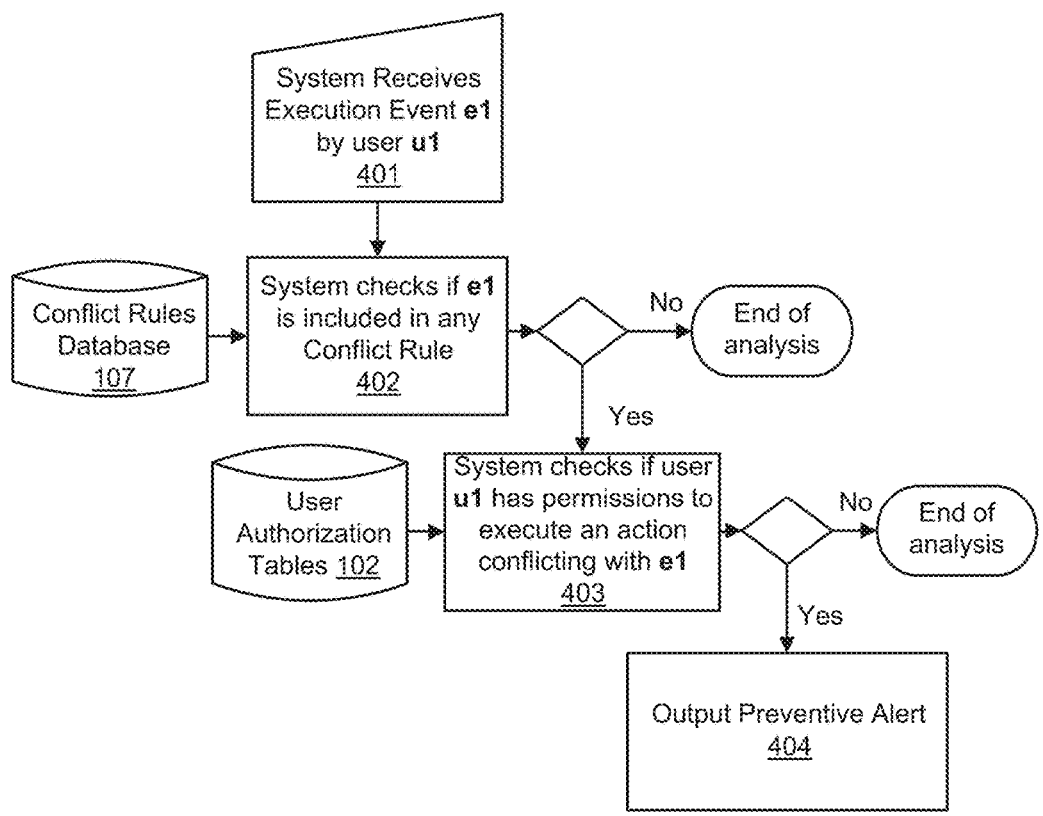
FIG. 4A is a flowchart illustrating steps involved for the detection of the preventive SoD violations while an execution event is received.

FIG. 4A is a flowchart illustrating an exemplary process for the detection of preventive SoD violations. An execution event e1 is received by the system, as shown by block 401. After receiving an execution event 101 (FIG. 1) which indicated user u1 executed e1, the SoD conflict detection engine 100 (FIG. 1) queries the conflict rules database 107 (FIG. 1) for actions conflicting with e1, as shown by block 402. If no results are returned, the analysis ends. If there are actions $a\_1, \ldots, a\_n$ conflicting with e1 according to the stored conflict rules, the conflict detection engine 100 (FIG. 1) checks whether user u1 has permissions to execute an action from the returned set $a\_1, \ldots, a\_n$ conflicting with e1, as shown by block 403. If no results are returned, the analysis ends. If user u1 has permissions to execute at least one action of the returned set $a\_1, \ldots, a\_n$ then the conflict detection engine 100 (FIG. 1) triggers a preventive alert, as shown by block 404.

Figure 4B:
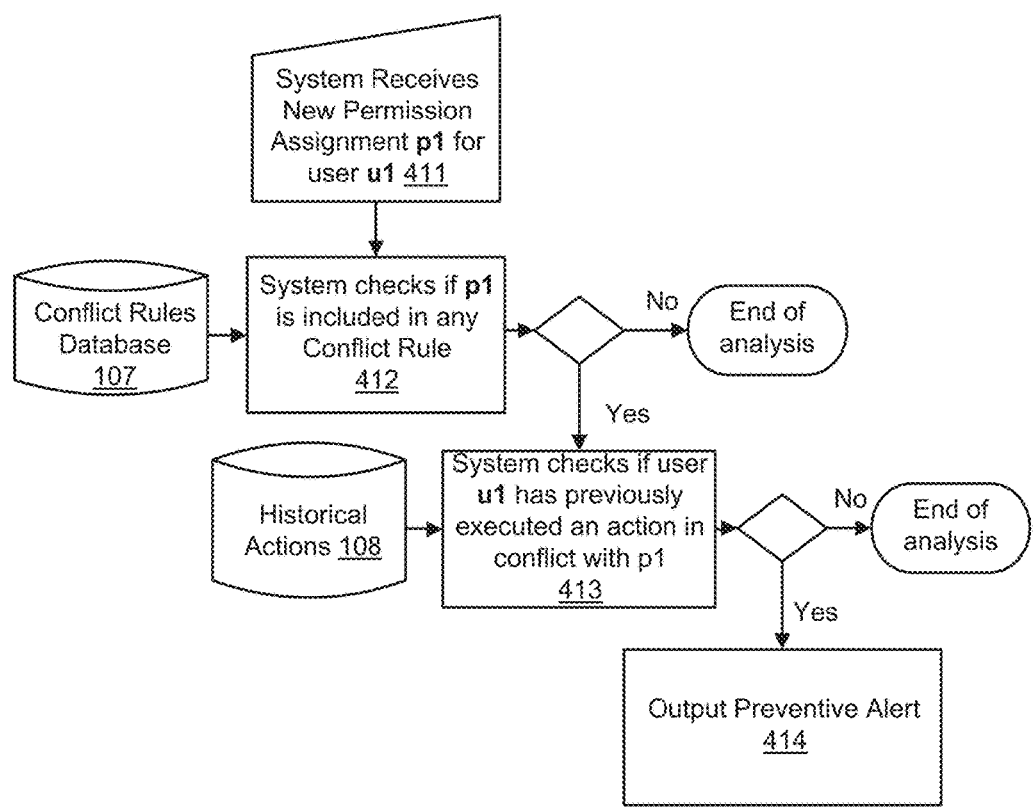
FIG. 4B is a flowchart illustrating steps involved for the detection of the preventive SoD violations while a new permission assignment is received.

FIG. 4B is a flowchart illustrating steps involved for the detection of the preventive SoD violations while a new permission assignment is received. After receiving a permission assignment 101 which indicated user u1 was granted permission p1, as shown by block 411 the SoD conflict detection engine 100 queries the conflict rules database 107 for actions conflicting with p1, a shown by block 412. If no results are returned, the analysis ends. If there are actions $a\_1, \ldots, a\_n$ conflicting with p1 according to the stored conflict rules, the detection engine 100 checks whether user u1 has permissions to execute an action from the returned set $a\_1, \ldots, a\_n$ conflicting with p1, as shown by block 413. If no results are returned, the analysis ends. If user u1 has permissions to execute at least one action of the returned set $a\_1, \ldots, a\_n$ then the conflict detection engine triggers a preventive alert, as shown by 414.

Preventive SoD Violations: Considerations

Preventive SoD violations can advantageously prevent potential frauds in addition to preventing improper authorizations assignments. Preventive SoD violations indicate when a user has executed certain action in conflict with another executable action. This is a real-time preventive control.

Even though SoD consists of regular authorization checks, a primary objective is to avoid frauds and/or errors in the business process. Preventive SoD detects fraud and/or errors in real-time.

Method 2: Detective SoD Violations within Process

This method checks for conflicting actions which arise when the user is actually using the incompatible actions reported, and more importantly, if the incompatible actions are happening inside the same process flow (or in the same transaction flow) to potentially perform a fraud.

The detective SoD method generates an alert (as described previously) when an SoD violation is effectively being exploited by a user, for example, performing two incompatible actions. An additional check within the detective SoD is actually verifying whether the SoD violation was performed in the same process flow (e.g. in the while creating a vendor and then issuing a payment to that same vendor, in the same system and by the same user).

An execution event e1 arrives at the system in real-time, as shown by block 401. The system looks for evidence of that user having executed a conflicting action a1 by querying the business tables 109 in the monitored system related to that specific execution. For example: if e1 is vendor payment, the tables where the system searches for evidence are the vendor master tables, analyzing if the same user actually created that vendor himself in the past through any conflicting action a1.

Figure 5:
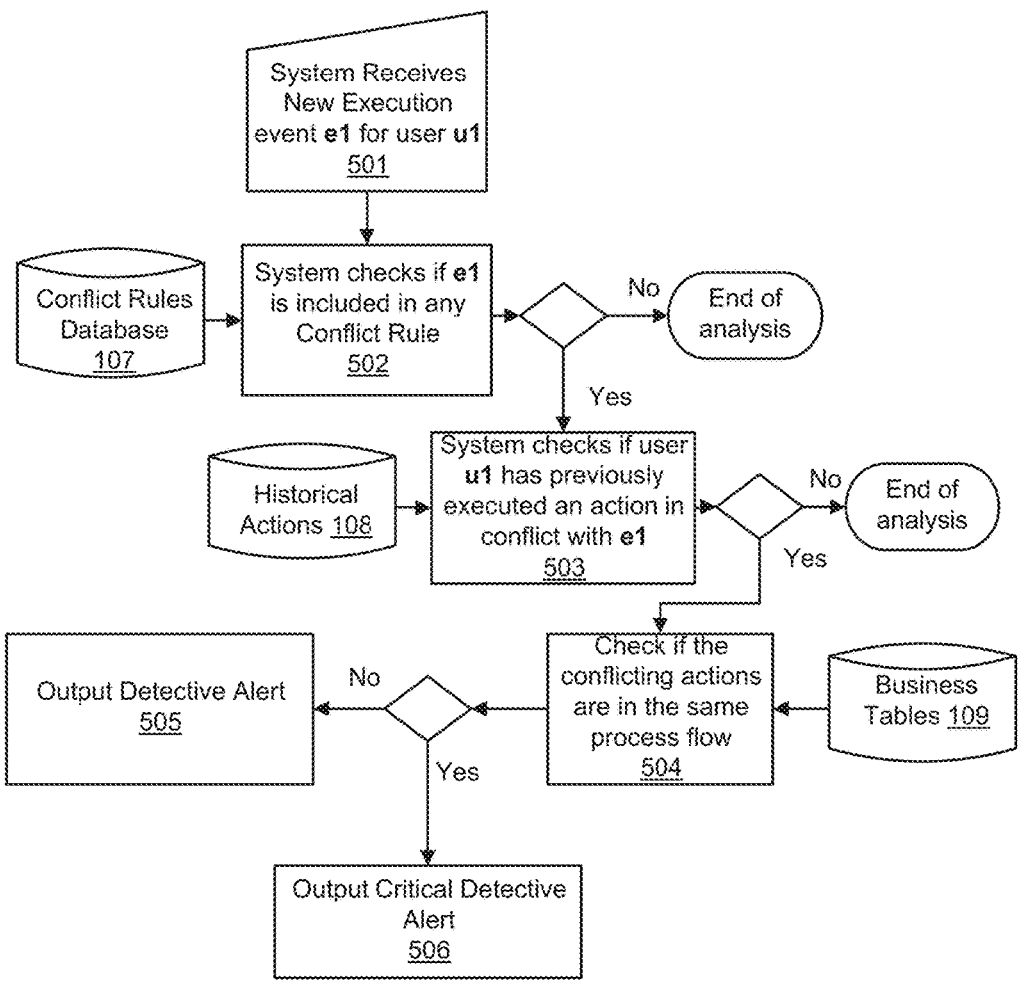
FIG. 5 is a flowchart illustrating steps involved in a detective method when a new execution event is received.

FIG. 5 is a flowchart illustrating steps involved in the Detective Method when a new Execution Event 101 is received. After receiving an Execution Event indicating that user u1 executed e1, as shown by block 501, the conflict detection engine 100 queries the Conflict Rules Database 107 for actions conflicting with e1, a shown by block 503. If no results are returned, the analysis ends. If there are actions a_1, . . . , a_n conflicting with e1 according to the stored conflict rules, the conflict detection engine 100 checks if user u1 has previously executed any of those conflicting actions by querying the Historical Actions Database 108, as shown by block 503. If the user had not executed any conflicting action the analysis finishes. On the other hand, if the user executed a subset of the conflicting actions a_1, . . . , a_n, the conflict detection engine 100 checks, for each executed action in conflict with e1, if it belongs to the same process flow e1 belongs to, as shown by block 504. This is done by querying the Business Tables 109 on the monitored system. If for a given conflicting action it determines that it is not in the same process flow, the conflict detection engine 100 triggers a Detective Alert, as shown by block 505. If it does belong to the same process flow, the conflict detection engine 100 triggers a Critical Detective Alert, as shown by block 506.

Technical SoD Rules

The alerts can be related to, for example, business processes (SoD rule) or to technical processes SoD rules. Some examples follow:

SoD Rule: Vendor Creation vs. Post Invoices (SAP™)

The effective segregation of duties conflict would take place when the same user that created the vendor master data, or extended for a company code or purchasing group is trying to post an invoice to that vendor:
 1) The system detects user u1 is executing a transaction (Execution Event) to post invoices to a certain Vendor, such as
   FB60, F-43, FB10, or any other invoicing transaction.
 2) The system checks, by querying different business tables, whether user u1 executed for that vendor one of the following transactions:
   LFA1: Vendor Central Master Data Creation/Update
   LFB1: Vendor per Company Code Creation/Update
   LFM1: Vendor per Purchasing Group If the username executing one of the actions found on step 2) matches the username for u1, the system will create a Critical Detective Alert 506, warning that someone is trying to post an invoice for a vendor that she previously created.

Technical Process SoD Rule: User Creation vs. Role Assignment (SAP™)

The effective segregation of duties conflict would take place when the same user created a new user u2 and is now trying to assign to that newly created user u2 a role:
 1) The system detects user u1 is executing transaction SU01 or PFCG and assigns a role to a specific user u2.
 2) The system checks if the user executing the transaction u1 was originally the one who also created the u2—the latter being the one assigned the new role.
 3) The system checks in the System Table 109 USR02 the field ANAME to see if it is the same user executing the role-assigning transaction on step 1).

Technical Process SoD Rule: User Creation vs. Role Assignment (Oracle™)

The segregation of duties conflict take place when the same user who creates a new user tries to assign to that new created user a role:
 1) The system detects a user u1 is executing application P95921 to assign a role to a specific user, be this last user u2.
 2) The system checks if u1 was originally the one who created the user u2—the latter being the one assigned the new role.
 3) The system checks in audit table F9312 the following fields:
   SHUSR0 to see if it is the same user executing the role-assigning application on step 1).
   SHEVTYP to check the action is an "add user."
   SHEVSTAT to check if the action was successfully completed.

If user u1 executing one of the actions found on step 1) matches the user name retrieved from step 3), the system will create a detective alert, warning that someone is trying to give permissions to a user created by the same user performing the assignment.

SoD Rule: Generate Purchase Order vs. Approve Purchase Order (Oracle™)

The effective segregation of duties conflict would take place when the same user who created a Purchase Order tries to approve it. In this case the employee could avoid the cross check.
 1) The system detects when user u1 is executing an application to approve a purchase order, such us: P43081
 2) The system checks, by querying different tables, whether user u1 generated the same purchase order trying to be approved in step 1). For this, it queries the tables for F4301 and/or F4311

If user u1 executing one of the actions found on step 1) matches the user name who created the purchase order queried on step 2), the system will create a Detective Alert, warning that someone is trying to approve an order that was created by the same user.

Selecting the Tables (SAP™)

By using the Detective approach the system is able to detect potential fraud attempts by detecting concrete violations of segregation of duties, and not just incorrect assignment of authorizations in the system as traditional tools do.

Depending on the Conflict Rule, the system has to check different database tables (User Authorization Tables 102, Business and Technical tables 109) to validate if the user previously performed an incompatible related action. Generally speaking, for the processes involved in the SoD matrix which are standard and common between SAP™ platforms the tables to be checked are known, some examples:
 Vendors->LFA1, LFB1, LFM1
 Customers->KNA1, KNB1, KNVV
 Financial Documents->BKPF, BSEG
 User Master Data->USR02
 Roles Master Data->AGR DEFINE and AGR* tables
 Purchase Orders->EKKO, EKPO
 Sales Orders->VBAK
 Client Settings->T000

Multiple rules can be created using the same table/set of tables. For example, in order to create a rule "Creation of Vendor Master Data vs Creation of Purchase Order" the tables the system needs to check are the Vendor Master Data tables (in this case those are LFA1, LFB1 and LFM1). With that group of tables new rules can be created to cover different conflicts for the same process, for example "Creation of Vendor Master Data" vs "Post Invoices", "Creation of Vendor Master Data" vs "Execute Payments", and/or "Creation of Vendor Master Data" vs "Good Receipt"

Detective SoD Violations within Process: SoD Conflict Caused by Deferred Transaction Executions The main advantage of the present method, is that the user doesn't need to have an explicit SoD conflict at a given moment in time (i.e., having two conflicting permissions at the same time). Traditional methods would only find cases where the user had an SoD conflict at some point in time. By using this approach the system will catch violations in which the user didn't necessarily had the SoD conflict in its entirety.

For example, assume that according to the SoD matrix action a1 is considered to be in conflict with action a2. At some point in time, permissions to execute a1 are assigned to user u1. The user executes a1 and then this permission is revoked from his profile. Further in time, permissions to execute a2 are assigned to u1 and when the user executes a2, the system finds that the user previously executed a1, generating a conflict, and the user never had the two authorizations at the same time.

Another important advantage of this SoD method is that it can find real SoD conflict executions, and not only improper authorization assignments. It will show whether a user is executing two parts of the same process flow in which another person should be involved, thus bypassing process controls.

Even though SoD consists on regular authorization checks, the real objective is to avoid frauds or errors in the business process, so detecting these cases would be directly linked to the SoD controls' ultimate goal.

The system will also report the execution of two incompatible transactions by the same user, even if they are not part of the same process flow, this case triggering a non-critical detective alert.

It is common to find special situations in organizations in which SoD conflicts are temporarily allowed for specific reasons, for example when an employee leaves the company, or is on a sick leave, or leaves for vacations, et cetera.

In these cases it is common to find conflicting accesses temporarily granted to a supervisor or to another user, potentially creating SoD violations that will be approved given the circumstances. If an auditor reviews the access log the violation would be justified, and maybe no further inquiries will be done.

In this scenario, the system will detect the execution of conflicting actions at the moment they are executed, so even though a conflicting set of permissions is temporarily approved, the effectively exercised conflict will be detected.

Historical SoD Violations

This method consists on rebuilding the authorizations assigned to a specific user at a given point in time, by using the historical authorizations tables, and validating whether the user had an SoD violation at that time by comparing to the SoD Matrix of that moment or the existing SoD matrix.

It is common to find a variety of custom actions (programs in Oracle platforms or transactions and reports in SAP implementations). Those actions are not always taken into account from the beginning of an SoD process among its rules. If a custom action is defined as critical after the SoD checks were already running, the conflict will not be triggered. With the present method SoD rules involving those custom actions could be analyzed retroactively, allowing to see if someone had the violation at some point in time.

Triggering Modes

The system can use different methods to detect if the user is or was authorized to execute two conflicting actions. This can be triggered manually by the user, by choosing a user and a period of time, or automatically by the application, for example, whenever an existing custom transaction is added to a conflict rule (or there is a change to the SoD Matrix).

Authorization History Tables

As an example, on SAP™ systems there are different tables to be analyzed:

User Master Data
    USR02: User Master
    USH02: User Master History
Profiles
    UST04: Profile x User
    USR04: User Profiles
    USH04: User Profiles—History
Authorizations
    USR10: Authorizations per profile
    USH10: Authorizations per profile—history
Authorizations Values
    UST12: Authorizations
    USR12: Authorization Values
    USH12: Authorizations Values—History By combining these tables, the user authorization history may be rebuilt in order to detect whether that user had violated a Conflict Detection Rule in a given period of time.

Figure 6:
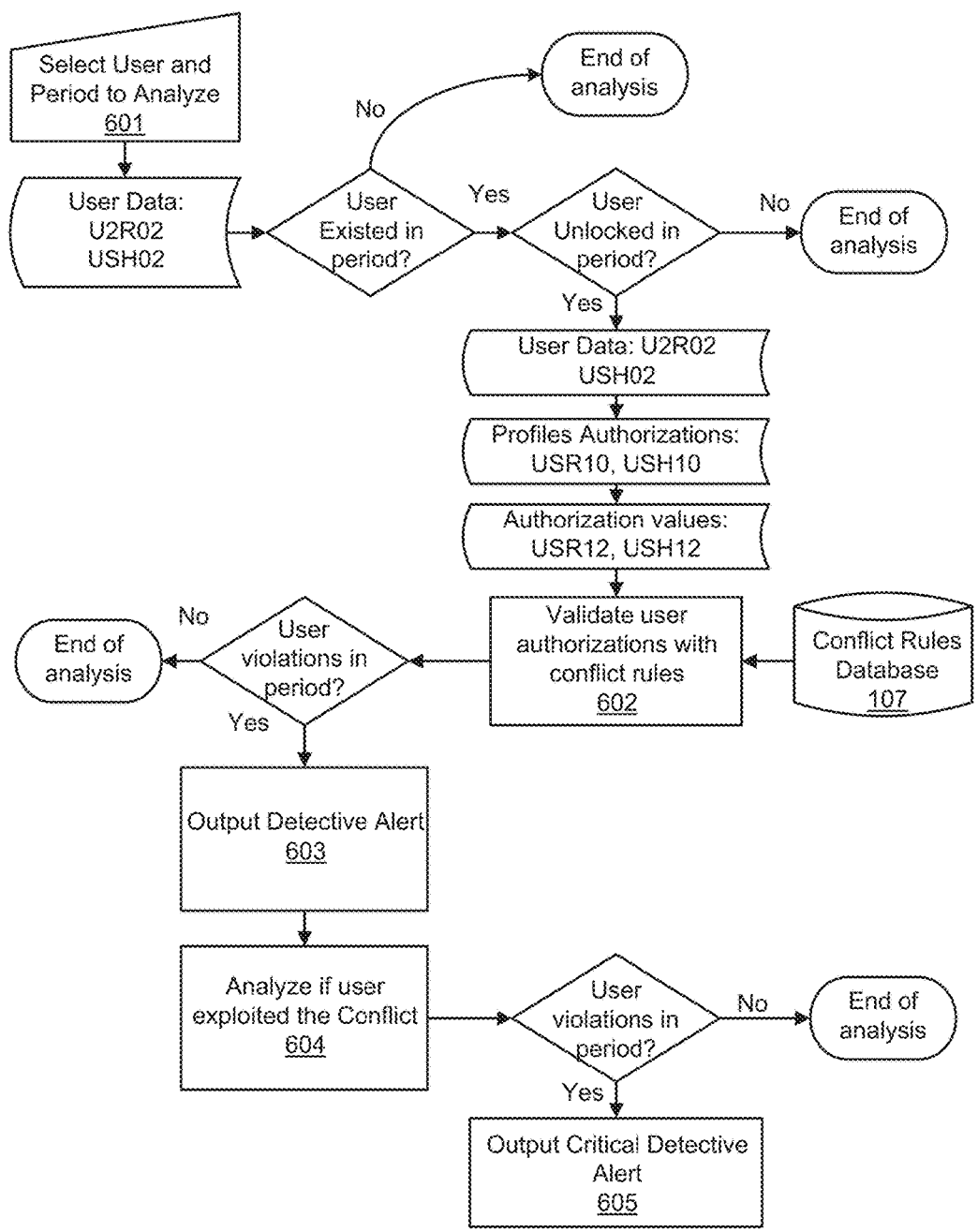
FIG. 6 is a flowchart illustrating the process for the historical method on an SAP environment.

FIG. 6 is a flowchart illustrating an exemplary process for the historical method on an SAP environment. The system allows the selection of the user and time period to be analyzed, as shown by block 601. The system proceeds by checking several tables among the Technical Tables 109 and the User Authorization Tables 102. The checks start by the system querying table USR02 in the audited system to retrieve the main user master data. After having the master data, the system queries table USH02 to check if the user existed and was unblocked in the analyzed period. If the user was active and unblocked, the system checks which roles and profiles the user had during that period by querying the tables USR04 (current profiles assigned to the user) and USH04 (historical profile assignments). Once the system recovered the assigned profiles in the analyzed time period, the system queries the authorizations each of those profiles had by that time by querying tables USR10 and USH10 and then UST12 and USH12 to finally have the authorization objects active for those profiles in the analyzed time period. With these authorization objects, the system is able to check for violations against the conflict detection rules, as shown by block 602. If the system detects a conflict, it raises a detective alert, as shown by block 603. Once the system determined there was a violation to the SoD rules defined in the Conflict Rules Database 107, the system checks whether the user effectively exercised the conflicting actions, by checking the process tables. The system analyzes if the user exploited the conflict, as shown by Block 604, and if so, outputs a critical detective alert, as shown by block 605.

Further Considerations

With the ability to analyze a new SoD matrix against an old authorization structure, organizations can use the present invention to understand the level of security they had at different points in time or within given periods, allowing a retroactive analysis. Analyzing past authorizations can help identifying potential risks that were not taken into account at that given moment. SoD matrices are changing according to business needs, or according to new discoveries in terms of new SoD rules. If an organization has a set of rules, and later in a year they discover that a conflict has not been analyzed, they could update their SoD matrices, handpick some users, and perform the check again to spot new conflicts overseen without this mechanism.

Custom Transactions and Programs

The SoD Rules are standard in terms of SAP™ TCODES or Oracle™ programs, but organizations have their own custom transactions and programs, which in many cases allow actions that are very similar to the standard ones. The described method gives organizations the possibility to analyze these cases and investigate potentially fraudulent situations in the past in which custom transactions and programs could be involved.

Effectively Exercised Violations

If a conflict is detected for a user in a given period, the system will automatically analyze the actions performed by that user in that period, trying to detect if the violation was effectively exercised or abused. When analyzing segregation of duties conflicts from previous periods, it is not only important to detect users having violations, but also check if they eventually exploited the access to commit a fraud by executing two incompatible actions in the same process flow. This method facilitates the investigation to detect fraudulent actions in the period and for the user under analysis.

This method can be related to the detective method, described previously so for each conflict detection rule, the set of tables to be checked is properly defined. For example, on an SAP environment, if the system detects a user had the violation "User Creation vs Role Assignment" for one month, it automatically checks for that period the following:

User Creation: Check in table USR02 if the user created a new username during that period, by filtering ANAME (Creator of the User) and ERDAT (Creation Date).

Role/profile Assignment: Having the list of users that were created by the user with the conflict, it checks table USH04, filtering BNAME=<List of users obtained from USR02> and MODBE=<username for which the conflict was detected>

For each conflict rule the system has identified the tables to check whether the violation was exercised or not. The system monitored by the present invention may be, for example, an enterprise resource planning (ERP) system. An ERP may have interconnected computers that share a central database. Each computer connected to the system can operate independently, but has the ability to communicate with other external devices and computers. Employees within an organization have different user accounts with various privileges in order to operate with the ERP system. These users generally have access only to what they need to do in their daily business operations.

Figure 7:
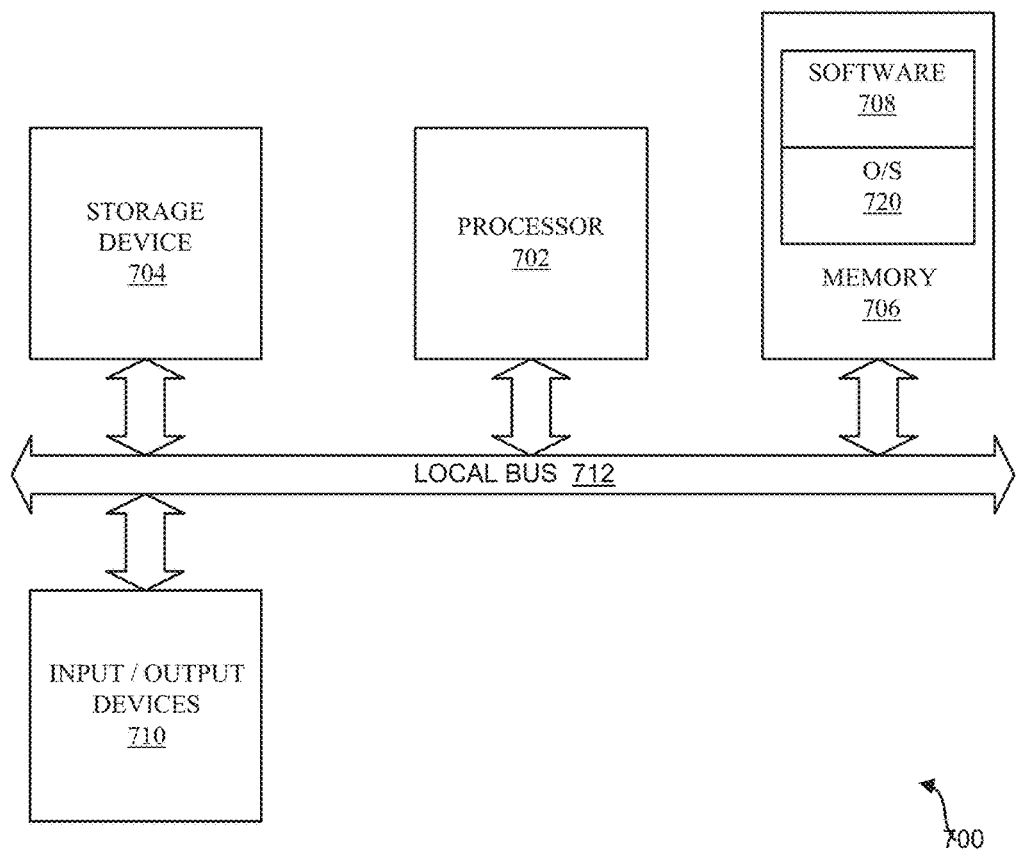
FIG. 7 is a schematic diagram illustrating an example of a system for executing functionality of the present invention.

The functionality of the embodiments described above may be executed by a computer system, an example of which is shown in the schematic diagram of FIG. 7. The system 700 contains a processor 702, a storage device 704, a memory 706 having software 708 stored therein that defines the abovementioned functionality, input and output (I/O) devices 710 (or peripherals), and a local bus, or local interface 712 allowing for communication within the system 700. The local interface 712 can be, for example but not limited to, one or more buses or other wired or wireless connections, as is known in the art. The local interface 712 may have additional elements, which are omitted for simplicity, such as controllers, buffers (caches), drivers, repeaters, and receivers, to enable communications. Further, the local interface 712 may include address, control, and/or data connections to enable appropriate communications among the aforementioned components.

The processor 702 is a hardware device for executing software, particularly that stored in the memory 706. The processor 702 can be any custom made or commercially available single core or multi-core processor, a central processing unit (CPU), an auxiliary processor among several processors associated with the present system 700, a semi-conductor based microprocessor (in the form of a microchip or chip set), a macroprocessor, or generally any device for executing software instructions.

The memory 706 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 706 may incorporate electronic, magnetic, optical, and/or other types of storage media. Note that the memory 706 can have a distributed architecture, where various components are situated remotely from one another, but can be accessed by the processor 702.

The software 708 defines functionality performed by the system 700, in accordance with the present invention. The software 708 in the memory 706 may include one or more separate programs, each of which contains an ordered listing of executable instructions for implementing logical functions of the system 700, as described below. The memory 706 may contain an operating system (O/S) 720. The operating system essentially controls the execution of programs within the system 700 and provides scheduling, input-output control, file and data management, memory management, and communication control and related services.

The I/O devices 710 may include input devices, for example but not limited to, a keyboard, mouse, scanner, microphone, etc. Furthermore, the I/O devices 710 may also include output devices, for example but not limited to, a printer, display, etc. Finally, the I/O devices 710 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 700 is in operation, the processor 702 is configured to execute the software 708 stored within the memory 706, to communicate data to and from the memory 706, and to generally control operations of the system 700 pursuant to the software 708, as explained above.

When the functionality of the system 700 is in operation, the processor 702 is configured to execute the software 708 stored within the memory 706, to communicate data to and from the memory 706, and to generally control operations of the system 700 pursuant to the software 708. The operating system 720 is read by the processor 702, perhaps buffered within the processor 702, and then executed.

When the system 700 is implemented in software 708, it should be noted that instructions for implementing the system 700 can be stored on any computer-readable medium for use by or in connection with any computer-related device, system, or method. Such a computer-readable medium may, in some embodiments, correspond to either or both the memory 706 or the storage device 704. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 702 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 700 is implemented in hardware, the system 700 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In summary, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system configured for real-time detection and prevention of segregation of duties (SoD) violations in a software application, comprising:
   a software application monitor configured to monitor an action executed by a user of the software application in real-time; and
   an SoD conflict detection engine comprising a processor configured to execute instructions stored in a memory, which when executed, perform the steps of:
   receiving by the SoD conflict detection engine a first action notification from the software application monitor comprising a first action and an associated user; storing the first action notification;
   receiving by the SoD conflict detection engine a second action notification from the software application monitor comprising a second action and the associated user; and
   determining whether the second action is a conflicting action with the first action according to a conflict rule in a conflict rule database,
   wherein the SoD is configured to monitor a software application to determine whether the second action of the associated user creates a conflict with the first action that would otherwise he authorized for the associated user,
   wherein the packet inspector is further configured to perform the steps of:
   receiving an application protocol packet from a communication network in communication with the software application or receiving application logs from the software application;
   forming the first or second action notification comprising the first or second action; and
   forwarding the first or second action notification to the SoD conflict detection engine.

2. The system of claim 1, wherein the packet inspector further comprises a packet collector configured to determine a protocol family of the packet according to the destination port and/or a packet structure of the packet.

3. The system of claim 1, wherein the packet collector further performs the step of extracting a username from the packet and updating a connection directory with that information.

4. The system of claim 3, wherein the packet collector further performs the steps of:
   determining whether the packet is compressed; and
   decompressing the packet.

5. The system of claim 4, wherein the packet collector is further configured to access a context database to determine the protocol family of the packet according destination port for the packet.

6. The system of claim 4, wherein the packet collector is further configured to dispatch the packet to a protocol processor associated with the determined protocol family.

7. The system of claim 4, wherein the packet collector is further configured to update the connection directory with the source and destination IP address and port of the packet.

8. The system of claim 1, wherein the SOD detection engine farther performs the steps of:
   querying a business table and/or a system table in the software application;
   checking if two conflicting actions are in a common process flow; and
   if the two conflicting actions are in a common process flow, outputting a critical detective alert.

9. The system of claim 1, wherein the Sol) detection engine is further configured to perform the step of updating an historical actions database.

10. The system of claim 9, wherein the processor further performs the step of determining the first or second action of the user in relation to a period of time.

11. The system of claim 10, wherein the processor further performs the step of determining if the user existed during the period of time.

12. The system of claim 11, wherein the processor further performs the step of determining if the user was unlocked during the period of time.

13. The system of claim 12, wherein the processor further performs the step of determining if the user executed the conflicting action during the period of time.

14. The system of claim 13, wherein the processor further performs the step of outputting an alert.

15. The system of claim 14, wherein the alert comprises one of the group consisting of a detective alert and a preventive alert.

16. The system of claim 1 wherein the SoD detection engine is configured to perform the step of looking up the user and first or second action in a table and determining if the user has permission to execute the first or second action upon receiving an action notification from the software application monitor.

17. The system of claim 1, wherein the packet inspector is configured to perform the step of creating or updating a connection entry in a connection directory using information selected from the group consisting of an IP source, a destination, and port.

18. The system of claim 1, wherein the packet inspector is configured to perform the step of extracting from the packet the first or second action from a group consisting of a transaction, a report, a program execution event, and a permission assignment.

19. The system of claim 15, wherein the preventive alert indicates a segregation of duties violation.

20. The system of claim 15, wherein the detective alert indicates the execution of the actions composing a segregation of duties violation.

21. The system of claim 19, further comprising a display screen configured to present a visual representation of the alert.

22. The system of claim 20, wherein the alert is forwarded to another application connected to the system via a software applications interface.

23. The system of claim 1, wherein the software application comprises a business-critical application from SAP and/or Oracle.

24. The system of claim 23, wherein the processor is further configured to perform the steps of:
   reading a SoD matrix from a third party; and
   populating the conflict rule database according to the contents of the SoD matrix,
   wherein the SoD matrix further comprises a plurality of entries, each of which expresses an incompatible permission and/or role inside the business-critical application.

25. The system of claim 6, wherein the protocol processor comprises a processor configured to process a protocol selected from the group consisting of SAP Dispatcher, SAPDIAG, SAP RFC/CPIC protocols, SAP ICM protocol, HTTP, IIOP, SAP P4, SAP HANA SQL/MDX protocol, JDENet protocol, JD Edwards Agent protocols, JMX, and SOAP.

26. The system of claim 1, wherein the first and/or second action comprises executing within the monitored software application at least one of the group consisting a program, a transaction, a report, a function, and an assignment of a permission.

27. A system configured for real-time detection and prevention of segregation of duties (SoD) violations in a software application, comprising:
   a software application monitor configured to monitor an action executed by a user of the software application in real-time; and
   an SoD conflict detection engine comprising a processor configured to execute non-transitory instructions stored in a memory, which when executed, perform the steps of:
   receiving by the SoD conflict detection engine a first action notification from the software application monitor comprising the a first action and the an associated user; storing the first action notification;
   receiving by the SoD conflict detection engine a second action notification from the software application monitor comprising a second action and the associated user; and
   determining whether the second action is a conflicting action with the first action according to a conflict rule in a conflict rule database,
   wherein the packet inspector is further configured to perform the steps of:
   receiving an application protocol packet from a communication network in communication with the software application or receiving application logs from the software application;
   forming the first or second action notification comprising the first or second action; and
   forwarding the first or second action notification to the SoD conflict detection engine.

* * * * *